United States Patent
DeLuca et al.

(10) Patent No.: US 9,014,634 B2
(45) Date of Patent: Apr. 21, 2015

(54) SOCIAL NETWORK BASED WI-FI CONNECTIVITY

(71) Applicant: International Business Machines Corporation, Armonk, NY (US)

(72) Inventors: Lisa Seacat DeLuca, San Francisco, CA (US); Ido Guy, Haifa (IL); Boaz Mizrachi, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 13/893,925

(22) Filed: May 14, 2013

(65) Prior Publication Data

US 2014/0342661 A1  Nov. 20, 2014

(51) Int. Cl.
 *H04B 7/00* (2006.01)
 *H04W 12/08* (2009.01)

(52) U.S. Cl.
 CPC .................................. *H04W 12/08* (2013.01)

(58) Field of Classification Search
 USPC ............... 455/410, 411, 41.2, 41.3, 517–519, 455/550.1, 566, 90.1
 See application file for complete search history.

(56) References Cited

U.S. PATENT DOCUMENTS

| | | | | |
|---|---|---|---|---|
| 7,127,261 B2 * | 10/2006 | Van Erlach | ............... | 455/456.5 |
| 7,177,597 B2 * | 2/2007 | Jung et al. | ..................... | 455/41.3 |
| 8,116,749 B2 * | 2/2012 | Proctor et al. | ............. | 455/414.3 |
| 8,234,300 B2 * | 7/2012 | Muller et al. | ................. | 707/781 |
| 8,239,452 B2 * | 8/2012 | Moore et al. | .................. | 709/204 |
| 8,385,896 B2 * | 2/2013 | Proctor et al. | ............. | 455/414.3 |
| 8,396,002 B2 * | 3/2013 | Marshall-Wilson | .......... | 370/252 |
| 8,699,952 B2 * | 4/2014 | Yeung | .......................... | 455/41.2 |
| 8,812,407 B2 * | 8/2014 | Appelman et al. | ............. | 705/319 |
| 2004/0125136 A1 * | 7/2004 | Wallenius | ...................... | 345/764 |
| 2005/0136901 A1 * | 6/2005 | Jung et al. | ..................... | 455/415 |
| 2007/0033197 A1 | 2/2007 | Scherzer et al. | | |

(Continued)

OTHER PUBLICATIONS

Lafuente et al.; Ttl: Flexible Communication: A Secure and Trust-Based Free Wi-Fi Password Sharing Service; Conf. Ttl: 2011 International Joint Conference of IEEE TrustCom-11/IEEE ICESS-11/FCST-11 (TrustCom 2011); 2011; Publisher: IEEE Computer Society, Los Alamitos, CA; Country of Publication: USA; ISBN: 978-0-7695-4600-1; Database: INSPEC.

(Continued)

*Primary Examiner* — Tuan A Tran
(74) *Attorney, Agent, or Firm* — Cahn & Samuels, LLP (57) ABSTRACT

An embodiment of the invention provides a method for social network based Wi-Fi, wherein an antenna of a mobile electronic device identifies at least one wireless network within range of the mobile electronic device, and wherein owner(s) of the wireless network(s) are identified with a processor. Relationship status(es) between the owner of the mobile electronic device and the owner(s) of the wireless network(s) are determined with an analysis engine. The wireless network(s) and the relationship status(es) between the owner of the mobile electronic device and the owner(s) of the wireless network(s) are displayed on the mobile electronic device. A request to access a wireless network is received from the owner of the mobile electronic device. Access to the wireless network is automatically granting when the relationship status between the owner of the mobile electronic device and the owner of the wireless network is above a predetermined threshold.

25 Claims, 5 Drawing Sheets

(56) References Cited

U.S. PATENT DOCUMENTS

| | | |
|---|---|---|
| 2010/0157823 A1 | 6/2010 | Li et al. |
| 2012/0110640 A1 | 5/2012 | Donelson et al. |
| 2012/0110643 A1 | 5/2012 | Schmidt et al. |
| 2012/0122514 A1 | 5/2012 | Cheng et al. |
| 2012/0192258 A1 | 7/2012 | Spencer et al. |
| 2013/0268357 A1* | 10/2013 | Heath .................. 705/14.53 |

OTHER PUBLICATIONS

Cassola et al.; Ttl: Demo: SNEAP: A social network-enabled EAP method no more open hotspots; Conf. Ttl: 9th International Conference on Mobile Systems, Applications, and Services, MobiSys'11 and Co-located Workshops; 2011; Publisher: Association for Computing Machinery; ISBN: 9781450306430; Database: Ei Compendex(R).

* cited by examiner

SOCIAL NETWORK BASED WI-FI CONNECTIVITY

BACKGROUND

The present invention is in the field of systems, methods, and computer program products for social network based Wi-Fi (wireless fidelity) connectivity.

The implementation and utilization of wireless computer networks are growing at a tremendous rate as computer (and other device) users become more and more mobile. Wi-Fi networks, in particular, have seen a surge in consumer use and have become a widely utilized standard for wireless networking Wi-Fi networks operate according to Institute of Electrical and Electronic Engineers (IEEE) 802.12 standard, which is supported by most hardware vendors.

SUMMARY OF THE INVENTION

An embodiment of the invention provides a method and system for social network based Wi-Fi, wherein an antenna of a mobile electronic device identifies at least one wireless network within range of the mobile electronic device, and wherein owner(s) of the wireless network(s) are identified with a processor. Relationship status(es) between the owner of the mobile electronic device and the owner(s) of the wireless network(s) are determined with an analysis engine, wherein a relationship status includes the level of connectedness on at least one social networking website.

The wireless network(s) and the relationship status(es) between the owner of the mobile electronic device and the owner(s) of the wireless network(s) are displayed on a display unit of the mobile electronic device. A request to access a wireless network is received from the owner of the mobile electronic device. Access to the wireless network is automatically granting when the relationship status between the owner of the mobile electronic device and the owner of the wireless network is above a predetermined threshold.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides systems and methods to build social network based Wi-Fi connectivity, wherein security is based on social networking relationships. A system can rely on an existing social network (e.g., FACEBOOK.COM) to access a wireless network. For example, a user A and a user B are connected in the social network if they allow each other to access their respective Wi-Fi connections (also referred to herein as "wireless networks"). In another example, an asymmetric social network exists where a user C is only connected to a user D if user C allows user D to connect to his Wi-Fi network.

In at least one embodiment, an electronic device displays all available wireless networks to a user and flags the wireless network whose owner the user has the best social path with. Thus, even if the user is not a direct connection to someone who owns a wireless network (e.g., the user is at a third level of connectedness (i.e., a friend-of-a-friend-of-a-friend)), the user can reach out to the owner and ask for permission based on a common friend. Overall, per location, the user can get an indication of how "connected" (s)he is to people who own wireless networks in the area.

An embodiment of the invention includes a system that provides an additional layer of information to available Wi-Fi access points. The Wi-Fi owner may choose to enable or disable the system. When a user searches for available network locations, any social networking relationships that exist between the user and owner(s) of the available network locations are displayed to the user. If an owner has allowed for their social networking information to be publically associated with their Wi-Fi account to unknown users, then a user that does not have access to the Wi-Fi account can contact the owner. In at least one embodiment, this allows requesting users to eventually connect to the owner where the users may be granted the access point Wi-Fi password; or, the users can start a social networking relationship with the owner. The system can allow the user a "one time" access as a gesture of friendship even if the user doesn't have the access point Wi-Fi password.

Figure 1:
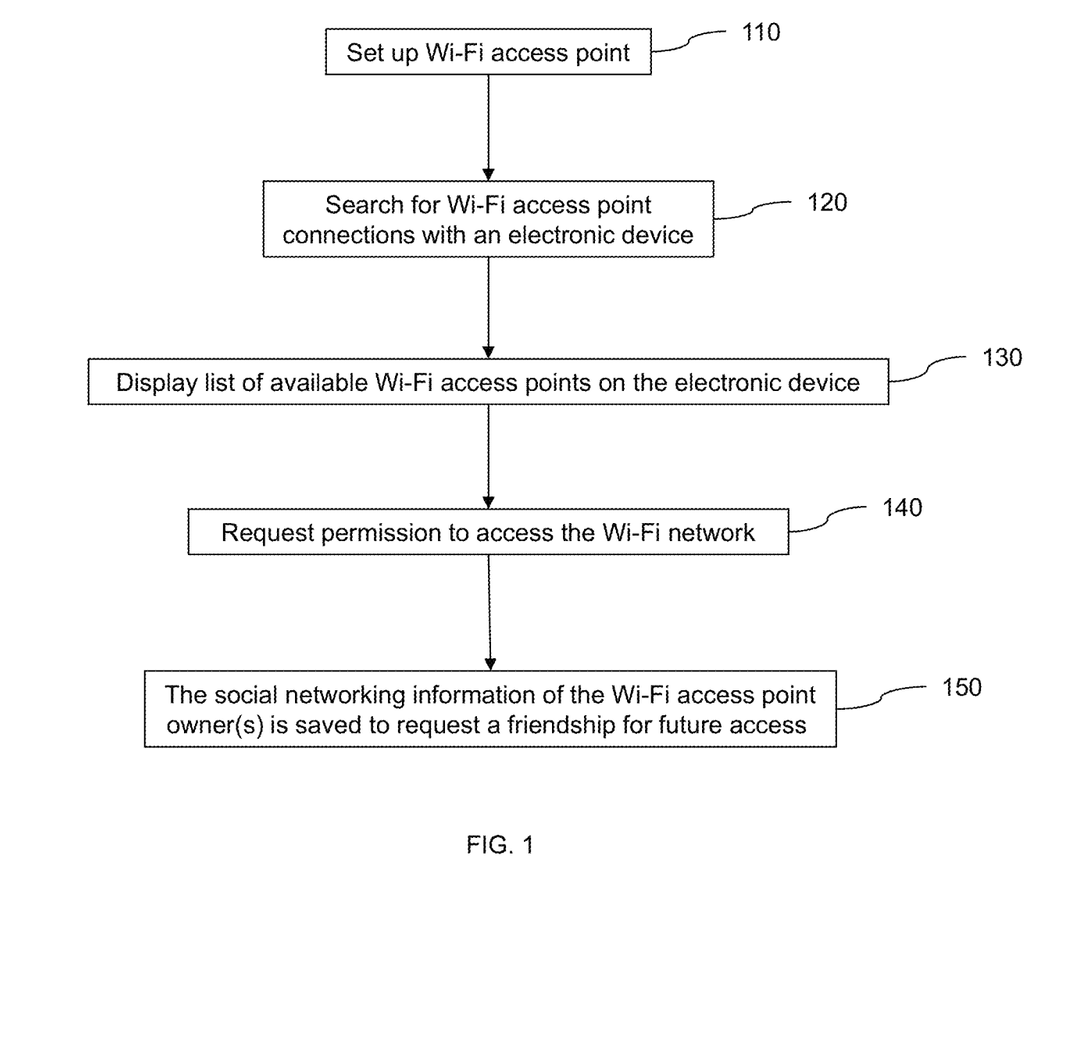
FIG. 1 is a flow diagram illustrating a method to build social network based Wi-Fi connectivity according to an embodiment of the invention.
Figure 2:
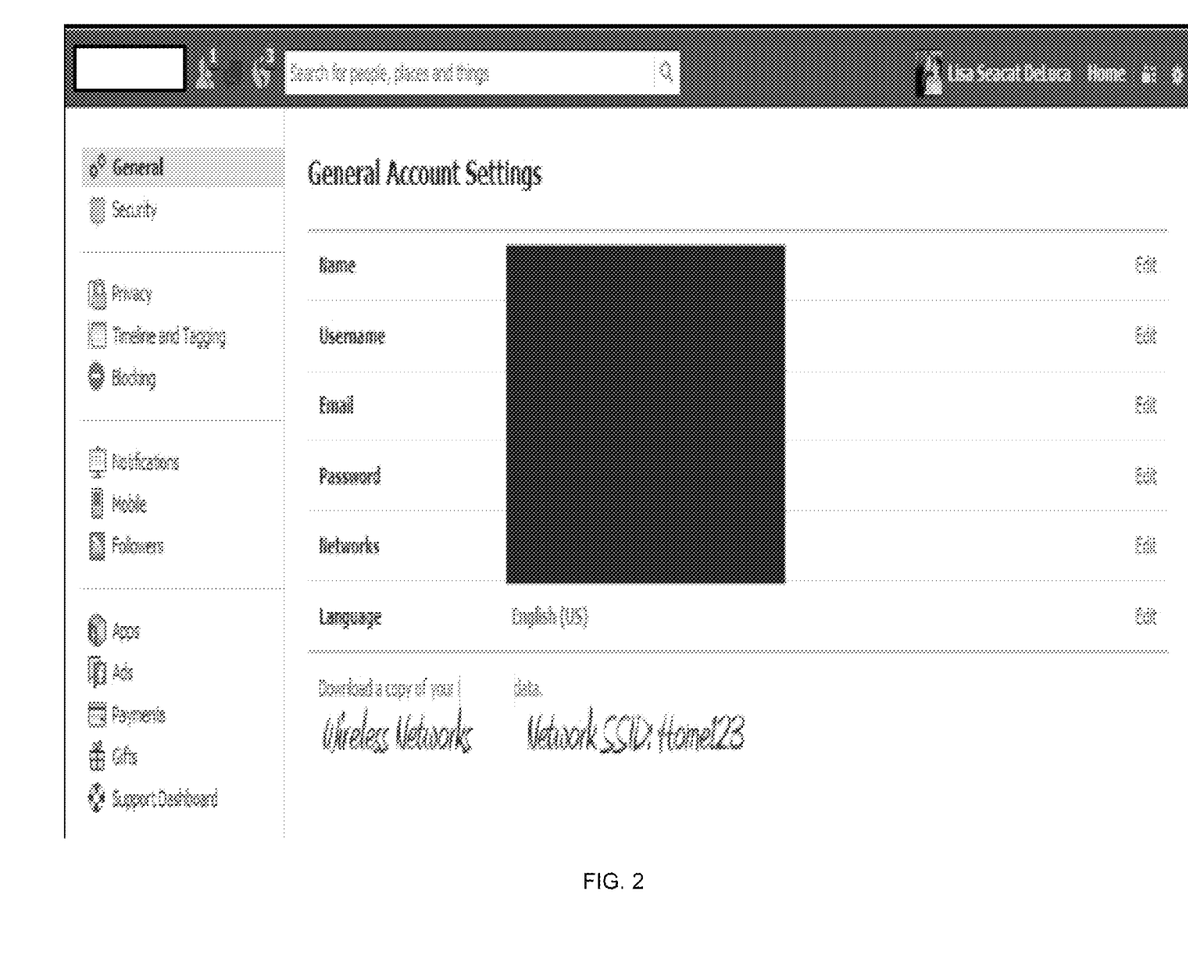
FIG. 2 illustrates a social networking webpage for setting access rules according to an embodiment of the invention.

FIG. 1 is a flow diagram illustrating a method to build social network based Wi-Fi connectivity according to an embodiment of the invention. A Wi-Fi access point owner sets up his access point 110. This can include associating the Wi-Fi access point with the owner's social networking profile and additional contact information. The owner can set permissions and rights for specific friendships/relationships, e.g., automatically allow Wi-Fi access to first degree friends (also referred to herein as "direct connections"). The owner can also set privacy rights, e.g., never share my social networking information with unknown users. In addition, the owner can set repetitive request rules (e.g., allow access once; allow access for all future connections) and/or temporary access rules (e.g., allow all requests immediate access for 3 minutes to give the owner time to verify the relationship). FIG. 2 illustrates a social networking webpage for setting access rules according to an embodiment of the invention.

An individual (also referred to herein as the "user") searches for Wi-Fi access point connections 120 using her electronic device (e.g., smart phone, tablet computer/device, laptop computer, and/or any other device that can search for access point connections). A list of available Wi-Fi access points are displayed on the individual's electronic device 130. Where available or made public, social networking information is also displayed on the electronic device. This can include the degree of friendship between the user and owner(s) of the Wi-Fi access points, if applicable. The degree of friendship could indicate, for example, that a Wi-Fi access point is owned by a first degree friend (e.g., Bob), a second degree friend (e.g., Bob's friend Sue), or a third degree friend (e.g., Sue's friend Tom). In at least one embodiment, other social networking information is displayed, such as the owners' social networking profile photo and/or latest status message.

The user requests permission to access the Wi-Fi network from one or more of the Wi-Fi locations 140. In one embodiment, a notification is sent to the access point Wi-Fi owner(s) asking them to deny or grant access to the requesting user. The notification can be sent to the owner(s) via their social networking account, e-mail account, phone call, and/or text message (e.g., SMS). If an owner is available, he or she can immediately approve the request, deny the request, allow temporary access to the wireless network, request additional information about the user's identity, and/or verify the social networking relationship. If the owner is unavailable, he or she can approve or deny the request at a later time and/or the request times out.

In another embodiment, if a rule is satisfied (e.g., minimum level or degree of connectedness between the owner and user) access to the wireless network is automatically granted to the user. In cases where no social networking relationship is found with the access point owners, the user saves the social networking information of the owner(s) to request a friendship for future access 150.

Figure 3:
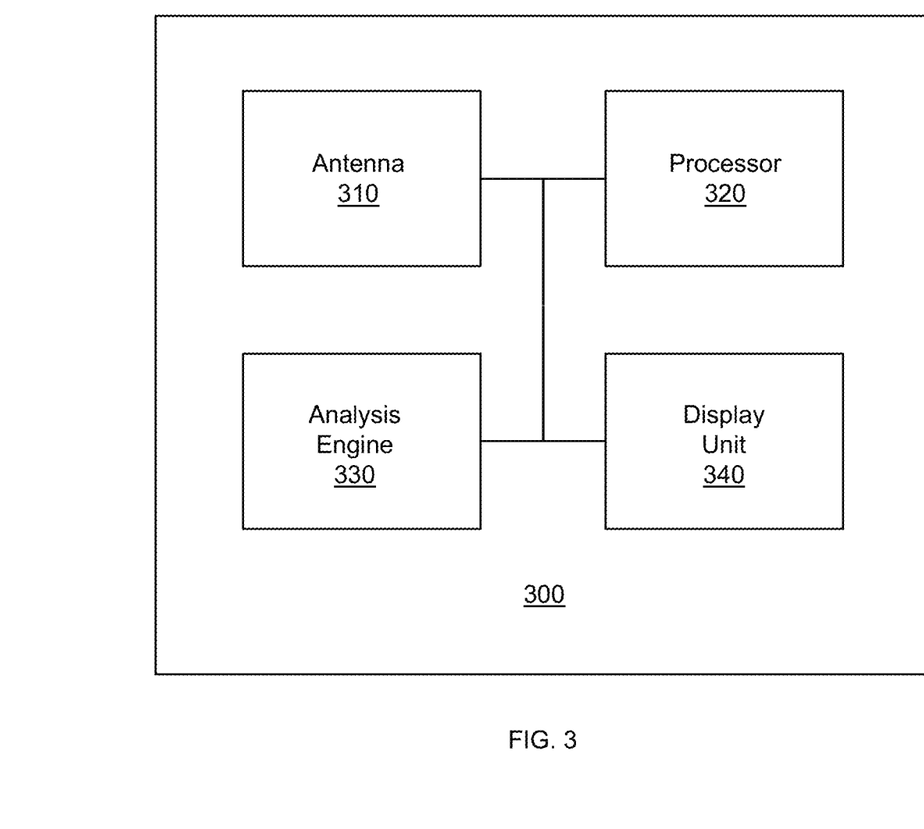
FIG. 3 illustrates a system for social network based Wi-Fi connectivity according to an embodiment of the invention.
Figure 4:
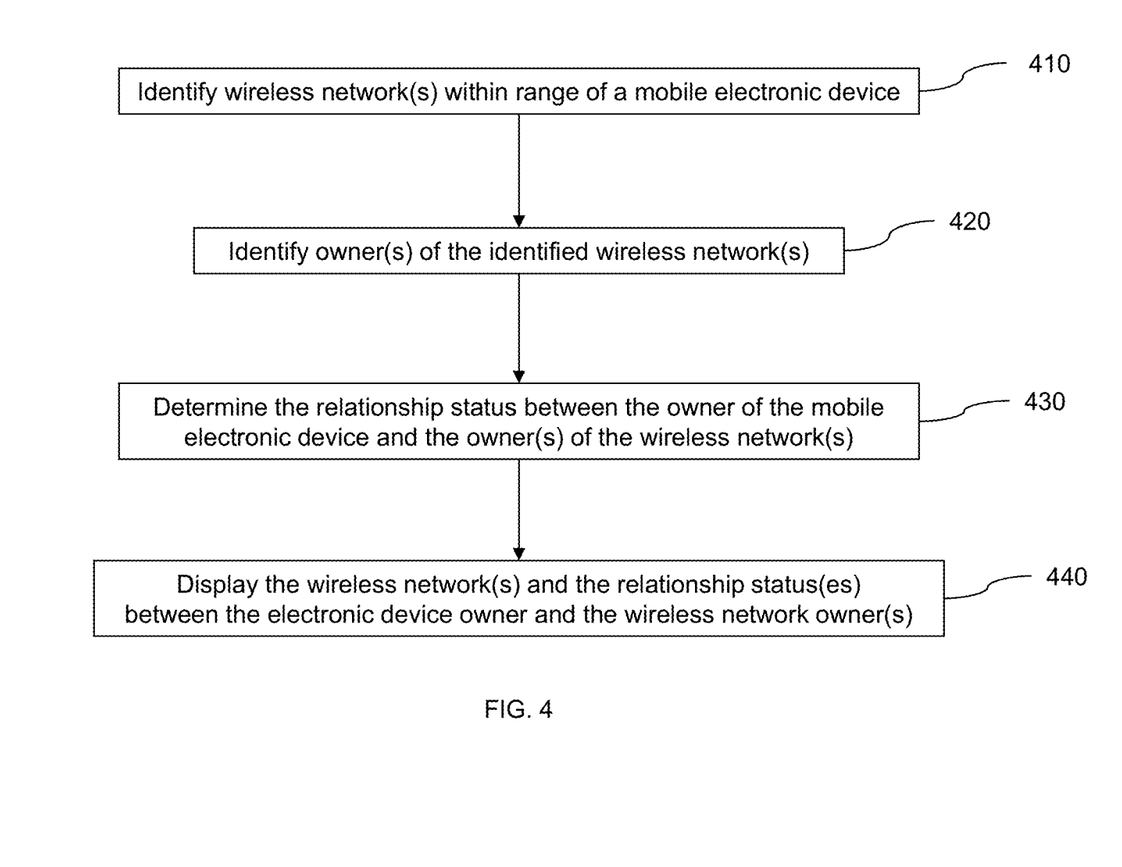
FIG. 4 is a flow diagram illustrating a method to build social network based Wi-Fi connectivity according to another embodiment of the invention.

FIG. 3 illustrates a system 300 for social network based Wi-Fi connectivity according to an embodiment of the invention, wherein the system includes an antenna 310, a processor 320, an analysis engine 330, and a display unit 340. FIG. 4 is a flow diagram illustrating a method to build social network based Wi-Fi connectivity according to an embodiment of the invention, wherein the method is performed by the system 300.

The antenna 310 of a mobile electronic device (also referred to herein as the "mobile device" or "electronic device") identifies one or more wireless networks within range of the mobile electronic device 410. The mobile electronic device can be a cell (or smart) phone, tablet computer/device, laptop computer. The processor 320 identifies the owner(s) of the identified wireless network(s) 420. As used herein, the term "owner" includes an individual or entity that owns or leases a wireless network from a wireless network service provider (e.g., John's Wireless Network, Jane's Mobile Hotspot, XYZ Hotel's Wireless Network) or the mobile electronic device.

The analysis engine 330 determines the relationship status between the owner of the mobile electronic device and the owner(s) of the wireless network(s) 430. The relationship status can include the level of connectedness on one or more social networking websites and/or professional networking websites. For example, on a social networking website, the mobile electronic device owner is a friend Jane, who is a friend of the wireless network owner. The mobile electronic device owner is not a friend of the wireless network owner. This is referred to herein as a second level of connectedness or a second degree friend. Specifically, the analysis engine 330 analyzes the social networking profile of the mobile device owner to determine that he is a friend of Jane and not a friend of the wireless network owner. Jane's social networking profile is analyzed by the analysis engine 330 to determine that the wireless network owner is a friend of Jane. In another example, on a professional networking website, the wireless network owner is a direct connection of the mobile electronic device owner. This is referred to herein as a first level of connectedness.

In another embodiment, the relationship status includes the presence of the electronic device owner on a contacts list of the wireless network owner, or the presence of the wireless network owner on a contacts list of the electronic device owner. For example, the electronic device owner is listed on the wireless network owner's cell phone contacts list, and/or the wireless network owner is listed on the electronic device owner's e-mail contacts list/address book. In yet another embodiment, the wireless network owner establishes a list of individuals and/or entities permitted to access the wireless network, wherein the relationship status includes the presence or absence of the electronic device owner on the list of users authorized to access the wireless network. The relationship status can also include an agreement that the electronic device owner is permitted to access the wireless network if the electronic device owner permits the wireless network owner to access a wireless network of the electronic device owner (i.e., a reciprocal access agreement).

The display unit 340 displays the wireless network(s) and the relationship status(es) between the electronic device owner and the wireless network owner(s) 440. In at least one embodiment, a communications device of the wireless network receives a request to access the wireless network from the electronic device owner. A control module connected to the communications device can automatically grant access to the wireless network when the relationship status between the wireless network owner and the electronic device owner is above a predetermined threshold. The control module can automatically deny access to the wireless network when the relationship status between the wireless network owner and the electronic device owner is below the predetermined threshold. In at least one embodiment, the control module automatically grants access to the wireless network when the electronic device owner is a member of a social network group (e.g., family, church, work) that the wireless network owner belongs to.

When the electronic device owner is not a direct connection/contact with any of the identified wireless network owners, the analysis engine 330 can identify the wireless network within the range of the electronic device that has the highest level of connectedness (e.g., social network connectedness) with the electronic device owner. For example, the display unit 340 displays the wireless networks within range of the electronic device and flags the wireless network that has an owner with the highest level of connectedness with the electronic device owner (e.g., fourth level social network connection). In another example, the identified wireless networks are ranked based on level of connectedness with the electronic device owner.

In at least one embodiment of the invention, a common connection is identified (e.g., with the analysis engine) when the electronic device owner is not a direct connection with any of the identified wireless network owners. The common connection is a direct connection of both the electronic device owner and one or more owners of the identified wireless networks. The common connection can be displayed to the electronic device owner on the display unit 340.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
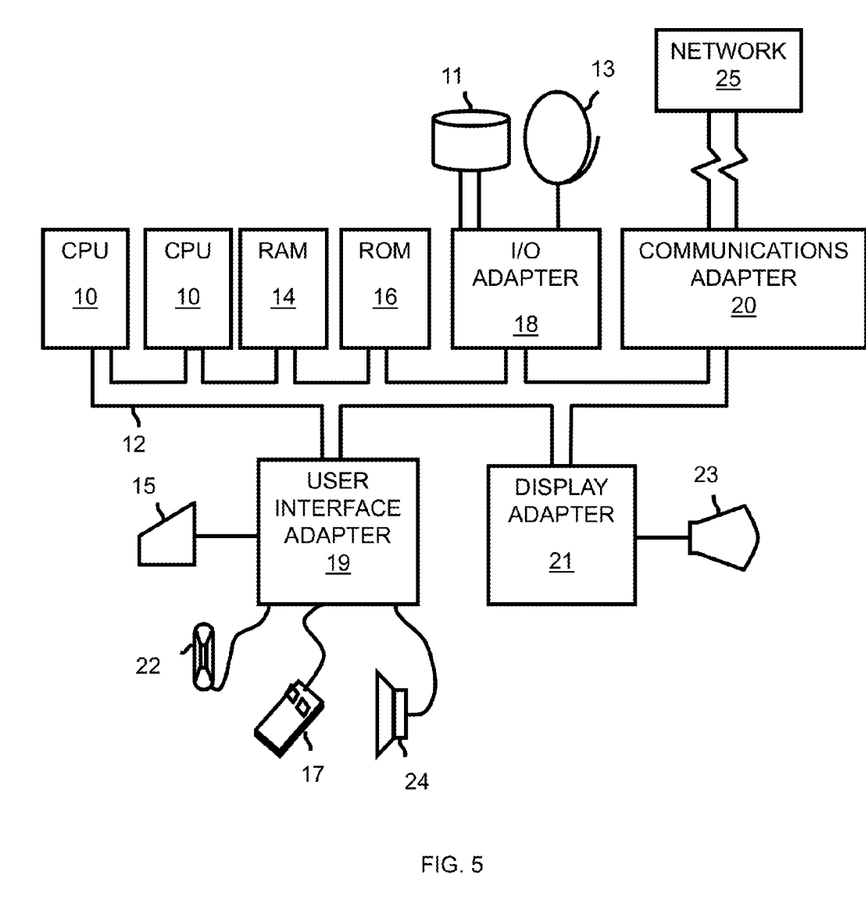
FIG. 5 illustrates a computer program product according to an embodiment of the invention.

Referring now to FIG. 5, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 12 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   identifying at least one wireless network within range of an electronic device;
   identifying an owner of the at least one wireless network with a processor;
   determining a relationship status between the owner of the at least one wireless network and an owner of the electronic device with an analysis engine; and
   displaying the at least one wireless network and the relationship status between the owner of the at least one wireless network and the owner of the electronic device on the electronic device.

2. The method according to claim 1, wherein the relationship status includes a level of connectedness on at least one social networking website.

3. The method according to claim 1, wherein the relationship status includes a level of connectedness on at least one professional networking website.

4. The method according to claim 1, wherein the relationship status includes at least one of:
   a presence of the owner of the electronic device on at least one contacts list of the of the owner of the at least one wireless network; and
   a presence of the owner of the at least one wireless network on at least one contacts list of the owner of the electronic device.

5. The method according to claim 1, wherein the relationship status includes a presence of the owner of the electronic device on a list of users authorized to access the at least one wireless network.

6. The method according to claim 1, wherein the relationship status includes an agreement that the owner of the electronic device is permitted to access the at least one wireless network if the owner of the electronic device permits the owner of the at least one wireless network to access a wireless network of the owner of the electronic device.

7. The method according to claim 1, further comprising:
   receiving a request to access the at least one wireless network from the owner of the electronic device; and
   automatically granting access to the at least one wireless network when the relationship status between the owner of the at least one wireless network and the owner of the electronic device is above a predetermined threshold.

8. The method according to claim 1, further comprising automatically granting access to the at least one wireless network when the owner of the electronic device is a member of a social network group that the owner of the at least one wireless network belongs to.

9. The method according to claim 1, further comprising identifying a wireless network within the range of the electronic device having a highest level of connectedness with the owner of the electronic device.

10. The method according to claim 1, further comprising ranking the identified wireless networks within the range of the electronic device based on connectedness with the owner of the electronic device.

11. The method according to claim 1, further comprising:
    identifying a common contact when the owner of the at least one wireless network is not a direct contact with the owner of the electronic device, the common contact being a direct contact of both the owner of the at least one wireless network and the owner of the electronic device; and
    displaying the common contact to the owner of the electronic device on the electronic device.

12. A method comprising:
    identifying at least one wireless network within range of a mobile electronic device with an antenna of the mobile electronic device;
    identifying an owner of the at least one wireless network with a processor;
    determining a relationship status between the owner of the at least one wireless network and an owner of the mobile electronic device with an analysis engine, the relationship status including a level of connectedness on at least one social networking website;
    displaying the at least one wireless network and the relationship status between the owner of the at least one wireless network and the owner of the mobile electronic device on a display unit of the mobile electronic device;
    receiving a request to access the at least one wireless network from the owner of the mobile electronic device; and
    automatically granting access to the at least one wireless network when the relationship status between the owner of the at least one wireless network and the owner of the mobile electronic device is above a predetermined threshold.

13. The method according to claim 12, wherein the relationship status includes at least one of:
    a presence of the owner of the mobile electronic device on at least one contacts list of the of the owner of the at least one wireless network; and
    a presence of the owner of the at least one wireless network on at least one contacts list of the owner of the mobile electronic device.

14. The method according to claim 12, wherein the relationship status includes a presence of the owner of the mobile electronic device on a list of users authorized to access the at least one wireless network.

15. The method according to claim 12, wherein the relationship status includes an agreement that the owner of the mobile electronic device is permitted to access the at least one wireless network if the owner of the mobile electronic device permits the owner of the at least one wireless network to access a wireless network of the owner of the mobile electronic device.

16. The method according to claim 12, further comprising identifying a wireless network within the range of the mobile electronic device having a highest level of connectedness with the owner of the mobile electronic device.

17. The method according to claim 12, further comprising ranking the identified wireless networks within the range of the mobile electronic device based on connectedness with the owner of the mobile electronic device.

18. The method according to claim 12, further comprising:
identifying a common connection when the owner of the at least one wireless network is not a direct connection with the owner of the mobile electronic device, the common connection being a direct connection of both the owner of the at least one wireless network and the owner of the mobile electronic device; and
displaying the common connection to the owner of the mobile electronic device on the display unit of the mobile electronic device.

19. A system comprising:
an antenna, said antenna identifies at least one wireless network within range of an electronic device;
a processor connected to said antenna, said processor identifies an owner of the at least one wireless network;
an analysis engine connected to said processor, said analysis engine determines a relationship status between the owner of the at least one wireless network and an owner of the electronic device; and
a display unit connected to said analysis engine, said display displays the at least one wireless network and the relationship status between the owner of the at least one wireless network and the owner of the electronic device.

20. The system according to claim 19, wherein the relationship status includes at least one of:
a level of connectedness on at least one social networking website;
a level of connectedness on at least one professional networking website;
a presence of the owner of the electronic device on at least one contacts list of the of the owner of the at least one wireless network;
a presence of the owner of the at least one wireless network on at least one contacts list of the owner of the electronic device;
a presence of the owner of the electronic device on a list of users authorized to access the at least one wireless network; and
an agreement that the owner of the electronic device is permitted to access the at least one wireless network if the owner of the electronic device permits the owner of the at least one wireless network to access a wireless network of the owner of the electronic device.

21. The system according to claim 19, further comprising:
a communications device connected to said processor, said communications device receives a request to access the at least one wireless network from the owner of the electronic device; and
a control module connected to said communications device, said control module automatically grants access to the at least one wireless network when the relationship status between the owner of the at least one wireless network and the owner of the electronic device is above a predetermined threshold.

22. The system according to claim 19, wherein said analysis engine identifies a wireless network within the range of the electronic device having a highest level of connectedness with the owner of the electronic device.

23. The system according to claim 19, wherein said analysis engine ranks the identified wireless networks within the range of the electronic device based on connectedness with the owner of the electronic device.

24. The system according to claim 19, further comprising:
wherein said analysis engine identifies a common contact when the owner of the at least one wireless network is not a direct contact with the owner of the electronic device, the common contact being a direct contact of both the owner of the at least one wireless network and the owner of the electronic device; and
wherein said display unit displays the common contact to the owner of the electronic device on the electronic device.

25. A computer program product comprising:
a non-transitory computer readable storage medium;
first program instructions to identify at least one wireless network within range of an electronic device;
second program instructions to identify an owner of the at least one wireless network;
third program instructions to determine a relationship status between the owner of the at least one wireless network and an owner of the electronic device; and
fourth program instructions to display the at least one wireless network and the relationship status between the owner of the at least one wireless network and the owner of the electronic device,
said first program instructions, said second program instructions, said third program instructions, and said fourth program instructions are stored on said computer readable storage medium.

* * * * *